Patented Dec. 11, 1951

2,578,001

UNITED STATES PATENT OFFICE 2,578,001

ASPHALT-BASE LAMINATING ADHESIVE

Richard H. Cubberley, Madison, Lyman P. Hill, Ridgewood, and Wilfred J. Mohr, Clifton, N. J., assignors to The Patent and Licensing Corporation, New York, N. Y., a corporation of Massachusetts No Drawing. Application May 21, 1949, Serial No. 94,738

3 Claims. (Cl. 260—758)

This invention relates to rubberized bituminous compositions and is particularly concerned with rubberized bituminous compositions suitable for use as hot-melt laminating adhesives.

Laminating adhesives find use in industry for joining two or more plies of sheet material and are of importance, for example, in the manufacture of flexible floor coverings, wall coverings and the like. One such type of flexible floor and wall-covering material is formed by laminating a resinous polymer sheet or a resinous polymer-coated sheet to a felted fibrous web. Laminating adhesives for flexible materials, to be successful from a practical standpoint, must be fluid at moderately elevated temperatures, so that they may be readily liquefied and applied, and they must combine low-temperature flexibility with adhesive and cohesive strength. Flexible floor and wall coverings are generally handled in rolled form and are unrolled, often at relatively low temperatures, when applied to a floor or wall surface. Further, during application and use a certain amount of flexing occurs under various temperature conditions. If the adhesive does not have low-temperature flexibility, i. e. if it becomes brittle at temperatures of the order of 40° F., it may crack, and delamination of the plies may occur during the unrolling and applying operations or during subsequent use. A satisfactory laminating adhesive must resist such cracking and delamination even at low temperatures. On the other hand, an adhesive which has good low-temperature flexibility but which is not resistant to flow at ordinary temperatures and as a result lacks sufficient cohesive strength to prevent the plies from being pulled apart or from being displaced with respect to one another, or which requires excessively high temperatures to attain sufficient fluidity to permit ready application to the sheets during manufacture, is of doubtful value from a commercial standpoint.

Owing to the relatively low cost of asphalt adhesives, attempts have heretofore been made to use asphalt-base compositions of various types as laminating adhesives for uniting flexible sheet materials. Among such compositions have been those containing rubber and asphalt. These prior adhesive compositions have, however, not proved entirely successful from a practical standpoint owing to a failure to meet one or more of the above-noted criteria.

In order to obtain low-temperature flexibility recourse has generally been had to plasticizing oils of various types. Such oils, however, adversely affect the other properties of the composition and have a particularly deleterious effect upon the cohesive strength of the adhesive. Generally speaking, therefore, rubberized bituminous compositions containing added plasticizer oils are not completely satisfactory as laminating adhesives for flexible sheet materials.

It is an object of this invention to provide an asphalt-base hot-melt laminating adhesive of improved characteristics.

It is a further object of this invention to provide an asphalt-base hot-melt adhesive suitable for laminating plies of flexible sheet materials.

It is a still further object of the invention to provide an adhesive of the character indicated which has low-temperature flexibility, cohesive and adhesive strength and which, while being resistant to flow at ordinary atmospheric temperatures, is readily liquefied by heating to moderately elevated temperatures.

Another object of the invention is to provide a rubberized bituminous hot-melt adhesive having low temperature flexibility and which does not contain a plasticizing oil.

Other objects of the invention will be apparent from the following detailed description.

According to the invention, a hot-melt laminating adhesive is produced by combining 13 to 25 parts by weight of reclaim natural rubber, reclaim butyl rubber, or mixtures thereof, 13 to 25 parts by weight of rosin, or a resinous derivative of rosin, and 50 to 74 parts by weight of an asphalt which is characterized by an asphaltene content between 20% and 40%.

The composition of the invention is a homogeneous blend of the specified ingredients, the reclaim rubbery material and the resinous component being apparently dissolved in the asphalt. These materials in the proportions specified cooperate to form a hot-melt adhesive having low-temperature flexibility, resistance to flow at temperatures up to about 125° F., adhesive and cohesive strength, and other properties desirable in laminating adhesive of the character indicated. While we do not wish to be bound by any particular theory, we believe that the combination of desirable properties exhibited by our composition is due to the high degree of homogeneity which characterizes our composition and which obviates the need for plasticizing oils. Particularly good results are obtained when our composition is compounded under conditions which do not promote decomposition of the rubbery reclaim, as will be described hereinafter.

Our composition has suitable fluidity at temperatures of the order of 350° to 400° F. for rapid application to a sheet by means of a roller-coater or the like, and is thus well suited to high speed industrial laminating procedures. In practice, a flexible floor covering formed, for example, by laminating a vinyl polymer-coated sheet to a sheet of asphalt-saturated fibrous felt by means of our hot-melt adhesive may be unrolled and applied at low temperatures, e. g. 40° F. without danger of delamination. Indeed, with our adhesive a bond between the two sheets is obtained which is effective under all temperature conditions normally encountered in the use of this type of floor covering. The adhesive is resistant to flow at temperatures up to about 125° F., with the result that displacement of the laminated plies does not occur, and its cohesive and adhesive strength are such that when two sheets are forcibly pulled apart the line of rupture occurs within the felt sheet rather than within the adhesive or at the interfaces between the adhesive and each of the sheets.

The natural rubber reclaim used in our composition is one obtained by reclaiming or devulcanizing a vulcanized natural rubber product such as vehicle tires, tubes and the like. Preferably, we employ a natural tube reclaim produced by the alkali digester process and we have found particularly suitable an alkali digester tube reclaim produced without the use of reclaiming oils or plasticizers. The butyl reclaim is obtained by reclaiming articles made of butyl rubber such as vehicle tubes. Butyl rubber is a commercial designation for copolymers of isobutylene and a conjugated diolefin such as butadiene, isoprene, or the like. One form of butyl rubber, known as GR–I, is formed by the copolymerization of 98% isobutylene and 2% isoprene. Butyl rubber is characterized by a low degree of chemical unsaturation.

While the reclaim rubbery material may represent from 13 to 25% by weight of the total composition, the reclaim preferably represents about one-sixth, or about 17% by weight of the final product. This is particularly advantageous when butyl reclaim is used as the rubbery component.

The resinous component of our adhesive is rosin, such as pine-wood gum rosin, or a resinous derivative of rosin, e. g. polymerized rosin, limed rosin, zinc-treated rosin, hydrogenated rosin, rosin esters, such as ester gum, and the like. We have found hydrogenated rosin particularly effective, for example, a commercial hydrogenated rosin having a saponification number of 167, an acid number of 162, and a softening point (ASTM ring and ball) of 157° F. Preferably, the resinous component represents about one-sixth, or about 17% by weight, of the total composition. That is to say, the reclaim and the resinous component are preferably present in our adhesive in substantially equal proportions and together constitute about one-third, by weight, of the final product.

The asphalt which we have found will combine with the reclaim rubber and resin component to form our homogeneous asphalt-base lamination adhesive is one having an asphaltene content of about 20% to 40% or, expressed in another way, a petrolene content of 60% to 80%. The asphaltene and petrolene content of a given asphalt or mixture of asphalts is readily determined, in accordance with procedures well-known to those skilled in the art, by treating the asphalt with an 86 to 88° Bé. paraffin naphtha having volatility characteristics such that at least 85% distils between 35 and 65° C. The asphaltenes represent the portion of the asphalt which is insoluble in the naphtha. The petrolenes are the portions of the asphalt which are soluble in the naphtha. A standard procedure for effecting the treatment of the asphalt with the naphtha is described in "Asphalts and Allied Substances" (5th ed.) by Herbert Abraham. Preferably, we use an asphalt having a softening point (ASTM ring and ball) between 150 and 220° F. and a penetration (77° F., 5 sec. 100 g.) of 0 to 75. We have found particularly suitable an oxidized asphalt having a softening point (ASTM ring and ball) of 180–190° F. and a penetration (77° F., 5 sec. 100 g.) of 18 to 24. Preferably, the asphalt comprises about two-thirds of our adhesive product i. e. about 66%, by weight, although from 50 to 74% by weight may be satisfactorily employed.

As previously stated, we have found when using natural reclaim or a mixture of butyl reclaim and natural rubber reclaim that a particularly effective and commercially suitable hot-melt laminating adhesive is obtained if the asphalt, reclaim and resin are compounded in such manner that the reclaim and resin are distributed uniformly in the asphalt while avoiding conditions that may cause the reclaim to be decomposed. Thus, we preferably compound our adhesive by the following process:

The reclaim is first masticated to soften it, as by means of an internal mixer, such as a Banbury mixer. After about five minutes treatment in such mixer, it is then sheeted out on a rubber mill. The sheeted reclaim is placed in an internal mixer of the Baker-Perkins or Werner-Pfleiderer type with a portion, say about 15%, of the resin to be used, and the batch mixed until smooth. With continued mixing, further increments of resin are added, time being allowed between each addition for the batch to become smooth. When all the resin has been added, the asphalt at a temperature of about 350° F. is added in the same manner, in increments of about 20% of the total asphalt to be added. During the mixing operation, the temperature in the mixer is not allowed to exceed about 350° F. After the addition of the last increment of asphalt, mixing is continued for about 30 to 45 minutes to insure the formation of a smooth, homogeneous solution. The product is then removed from the mixer and poured into containers to cool and solidify.

The following examples are further illustrative of the invention, all parts being by weight.

*Example I*

Seven hundred parts of a natural gray tube alkali digester reclaim were charged into a Banbury mixer and treated for about 5 minutes at 200° F. The treated rubber was transferred to a rubber mill and sheeted out and then charged into a Baker-Perkins mixer. After mixing was begun, 100 parts of Staybelite resin (a hydrogenated rosin having a saponification number of 167, an acid number of 162 and a softening point of 157° F.) were added and after the mass became smooth, another 600 parts of resin were added in 100-part increments, the mass being mixed until smooth between each addition. When all the Staybelite resin had been blended with the reclaim, addition of asphalt was begun. The asphalt was a straight blown petroleum flux oil having a softening point of 180–190° F. (ASTM ring and ball), a penetration of 18 to 24 (77° F., 100 g., 5 sec.), and an asphaltene content of about 30%. A total of 2700 parts were added in approximately 200-part increments, care being taken to mix the mass until smooth between each addition. After the last increment of asphalt had been added, mixing was continued until the mass was smooth, which required about 30 minutes. The total time required for the process was about 5 hours.

The product had the following composition:

| | Per cent |
|---|---|
| Staybelite resin | 16.67 |
| Reclaim (alkali digester natural tube) | 16.67 |
| Oxidized asphalt (180–190° F. M. P.) | 66.66 |

The above composition was melted at 375° F. in a heated tank, transferred to a roller-coater trough, and applied to a sheet of asphalt-saturated felt. A fibrous sheet coated with a vinyl polymer was then applied to the adhesive-coated sheet and the two sheets united by passing them between press rolls. The resulting laminated product wherein the saturated felt served as a base and the vinyl-coated sheet served as a surfacing layer, did not delaminate when flexed and slapped several times against a hard surface at 40° F. When the two plies were pulled apart by a sudden, sharp force, the line of rupture occurred within the felt sheet rather than within the adhesive or at the adhesive-sheet interfaces.

*Example II*

The following composition, in which butyl reclaim was used as the rubbery component in place of natural rubber reclaim, was prepared in accordance with the procedure used in Example I:

| | Per cent |
|---|---|
| Staybelite resin | 16.67 |
| Butyl reclaim | 16.67 |
| Oxidized asphalt (180–190° F. M. P.) | 66.66 |

This product exhibits low temperature flexibility when tested at 40° F. and has satisfactory adhesive and cohesive strength.

Similarly, hot-melt laminating adhesives having improved low-temperature characteristics are prepared in accordance with our invention with mixtures of natural rubber reclaim and butyl reclaim, a mixture of equal parts by weight of each type of reclaim being particularly advantageous.

While we preferably employ an asphalt which in itself has the specified asphaltene content, as for example the oxidized asphalt of 180–190° F. melting point, contained in the compositions of the examples, and which was produced by air oxidation of petroleum flux oil, we may also satisfactorily employ a mixture or blend of two or more asphalts in proportions to give the desired asphaltene content.

It will be observed that the compositions made in accordance with our invention are free from plasticizing oils and that the desirable combination of properties which characterizes our hot-melt laminating adhesive apparently results solely from the interaction of the specified components.

We claim:

1. A hot-melt asphalt base-laminating adhesive consisting essentially of about 17 parts by weight of a resinous material selected from the group consisting of rosin and resinous derivatives thereof, about 17 parts by weight of an alkali digester natural rubber reclaim, and about 66 parts by weight of an asphalt having a softening point (ASTM ring and ball) of 150° to 220° F., a penetration (770° F., 5 seconds, 100 grams) of 0 to 75 and an asphaltene content of 20 to 40%, said adhesive being characterized by low-temperature flexibility.

2. A hot-melt asphalt-base laminating adhesive consisting essentially of about 17 parts by weight of hydrogenated rosin, about 17 parts by weight of an alkali digester natural rubber reclaim, and about 66 parts by weight of an asphalt having a softening point (ASTM ring and ball) of 180 to 190° F., said adhesive being characterized by low-temperature flexibility.

3. A hot-melt asphalt-base laminating adhesive consisting essentially of 13 to 15 parts by weight of a resinous material selected from the group consisting of rosin and resinous derivatives thereof, 13 to 25 parts by weight of an alkali digester natural rubber reclaim, and 50 to 74 parts by weight of an asphalt having a softening point (ASTM ring and ball) of 150° to 220° F., a penetration (77° F., 5 seconds, 100 grams) of 0 to 75 and an asphaltene content of 20 to 40%, said adhesive being characterized by low-temperature flexibility.

RICHARD H. CUBBERLEY.
LYMAN P. HILL.
WILFRED J. MOHR.

REFERENCES CITED

The following references are of record in the file of this patent:

UNITED STATES PATENTS

| Number | Name | Date |
|---|---|---|
| 2,166,236 | Crawford | July 18, 1939 |
| 2,311,301 | Livermore | Feb. 16, 1943 |
| 2,347,211 | Merrill et al. | Apr. 25, 1944 |
| 2,377,647 | Pragoff | June 5, 1945 |
| 2,431,386 | Fisher | Nov. 25, 1947 |
| 2,436,332 | Rollhaus | Feb. 17, 1948 |
| 2,454,506 | Fisher | Nov. 23, 1948 |
| 2,481,370 | Berge | Sept. 6, 1949 |
| 2,504,605 | Thomas | Apr. 18, 1950 |

Certificate of Correction

Patent No. 2,578,001 December 11, 1951

RICHARD H. CUBBERLEY ET AL.

It is hereby certified that error appears in the printed specification of the above numbered patent requiring correction as follows:

Column 6, line 15, for "770° F." read 77° F.; line 28, for "15 parts" read 25 parts;

and that the said Letters Patent should be read as corrected above, so that the same may conform to the record of the case in the Patent Office.

Signed and sealed this 29th day of April, A. D. 1952.

[SEAL]

THOMAS F. MURPHY,
*Assistant Commissioner of Patents.*